(12) United States Patent
Campbell et al.

(10) Patent No.: US 7,896,366 B2
(45) Date of Patent: Mar. 1, 2011

(54) LEVER-ACTUATED RETRACTABLE WHEEL AND MOVABLE PLATFORM USING SAME

(75) Inventors: Geoffrey George Campbell, Kensington (AU); Hugh Lithgow Stark, Kareela (AU)

(73) Assignee: JLG Industries, Inc., McConnellsburg, PA (US)

( * ) Notice: Subject to any disclaimer, the term of this patent is extended or adjusted under 35 U.S.C. 154(b) by 1027 days.

(21) Appl. No.: 11/581,785

(22) Filed: Oct. 17, 2006

(65) Prior Publication Data

US 2008/0088102 A1   Apr. 17, 2008

(51) Int. Cl.
 *B62D 21/14* (2006.01)
 *B62D 1/54* (2006.01)
 *B60S 9/02* (2006.01)

(52) U.S. Cl. ............... 280/43.17; 280/491.1; 280/763.1
(58) Field of Classification Search ............ 280/43, 280/205, 491.1, 491.4, 656, 47.2, 47.21, 280/47.22, 763.1, 764.1, 766.1, 767, 661
See application file for complete search history.

(56) References Cited

U.S. PATENT DOCUMENTS

| | | | |
|---|---|---|---|
| 460,647 A | 10/1891 | Mills | |
| 788,992 A | 5/1905 | Bauer | |
| 1,857,611 A * | 5/1932 | Swift | 280/764.1 |
| 1,993,458 A * | 3/1935 | Sintz | 280/43 |
| 2,595,453 A * | 5/1952 | Gilmore | 280/763.1 |
| 2,607,606 A * | 8/1952 | Millen | 280/43.1 |
| 2,829,906 A * | 4/1958 | Hull | 280/767 |
| 2,961,249 A * | 11/1960 | Petersen et al. | 280/656 |
| 3,004,770 A * | 10/1961 | Park, III et al. | 280/755 |
| 3,115,211 A | 12/1963 | Ostrander, Jr. | |
| 3,291,254 A | 12/1966 | Mihalik | |
| 3,578,353 A * | 5/1971 | Lockhart | 280/47.2 |
| 3,737,007 A | 6/1973 | Herrell | |
| 3,752,263 A | 8/1973 | Thevenot | |
| 4,049,081 A | 9/1977 | McDonald et al. | |
| 4,183,423 A | 1/1980 | Lewis | |
| 4,194,591 A | 3/1980 | Fisher | |
| 4,427,094 A | 1/1984 | Winkelblech | |
| 4,512,440 A | 4/1985 | Bixby | |
| 4,592,447 A | 6/1986 | Ream et al. | |
| 4,681,330 A * | 7/1987 | Misawa | 280/47.2 |
| 5,044,473 A | 9/1991 | Gripe | |
| 5,348,326 A * | 9/1994 | Fullenkamp et al. | 280/43.17 |
| 6,026,931 A | 2/2000 | Swiderski | |
| 6,095,284 A | 8/2000 | Smith | |
| 6,471,004 B2 | 10/2002 | Stringer et al. | |
| 6,520,460 B2 * | 2/2003 | Hallberg et al. | 248/188.5 |

(Continued)

FOREIGN PATENT DOCUMENTS

DE          88 13 212          12/1988

(Continued)

*Primary Examiner* — J. Allen Shriver, II
*Assistant Examiner* — Bridget Avery
(74) *Attorney, Agent, or Firm* — Nixon & Vanderhye P.C.

(57) ABSTRACT

A retractable wheel assembly includes a wheel frame supporting a wheel, and a pivot bracket assembly secured to the wheel frame. The pivot bracket assembly is displaceable between an extended position and a retracted position. A biasing mechanism is coupled with the pivot bracket assembly. The biasing mechanism urges the pivot bracket assembly toward the extended position when the pivot bracket assembly is in the extended position and urges the pivot bracket assembly toward the retracted position when the pivot bracket assembly is in the retracted position.

14 Claims, 3 Drawing Sheets

U.S. PATENT DOCUMENTS 6,523,640 B1 2/2003 Young et al.

FOREIGN PATENT DOCUMENTS

| | | |
|---|---|---|
| DE | 201 04 597 | 8/2001 |
| EP | 0 192 170 | 8/1986 |
| FR | 2 128 254 | 10/1972 |
| GB | 1034060 | 6/1966 |
| GB | 1034209 | 6/1966 |
| GB | 2 211 237 | 6/1989 |

* cited by examiner

LEVER-ACTUATED RETRACTABLE WHEEL AND MOVABLE PLATFORM USING SAME

CROSS-REFERENCES TO RELATED APPLICATIONS (Not applicable)

STATEMENT REGARDING FEDERALLY SPONSORED RESEARCH OR DEVELOPMENT (Not applicable)

BACKGROUND OF THE INVENTION

The present invention relates to a retractable wheel assembly and, more particularly, to a retractable wheel assembly particularly suited for a movable platform or the like that is retractable to stabilize a platform working position.

Large structures such as scaffolding, aerial work platforms, ladder lifts and the like can be made manually movable with the addition of wheels. Caster wheels are particularly suited for such an application due to their multi-directional capabilities. A problem arises, however, when such a movable structure is supported on an inclined surface. Brakes may be added to the wheels to prevent the movable structure from moving, but brakes can wear over time and are subject to failures.

Known structures for moving such items include spring mounted casters and over center casters. Spring mounted casters have an advantage of automatically retracting when loaded, but suffer in that the casters still exert force when the device is loaded, which can make the device less stable when loaded, particularly with occupants at height. Over center mounted casters are either on or off, but do not automatically retract when the device is loaded. Ideally, it would be desirable to provide a device that combines the positive features of the known structures while avoiding the negative features.

BRIEF SUMMARY OF THE INVENTION

It would thus be desirable to provide a retractable wheel assembly that provides selective movability of a movable structure by extending and retracting a caster wheel or other suitable wheel type. It would be further desirable if the assembly could retract automatically without exerting a spring force or the like when the wheel is retracted. Additionally, the assembly should be extendable with minimum effort by the operator.

A retractable wheel assembly utilizes a biasing mechanism that is positioned relative to a leverage bracket to provide a pivoting force on the retractable wheel assembly on opposite sides of a pivot depending on whether the wheel is extended or retracted. In the retracted position, the leverage bracket is positioned such that the biasing mechanism urges the assembly to stay in the retracted position. When it is desired to extend the wheel assembly, a lever or other manual aid guides the biasing mechanism to change its position relative to the leverage bracket and assume an over-center position that holds the wheel mechanism in the extended position during use. The force of the biasing mechanism and the geometry of the assembly are configured such that when the movable structure is positioned in a desired location, a vertical load, such as stepping on the platform or other movable structure, causes the leverage bracket to retract the wheel assembly, and thereby secure the movable structure at its intended working location.

In an exemplary embodiment of the invention, a retractable wheel assembly includes a wheel frame supporting a wheel and a pivot bracket assembly secured to the wheel frame. The pivot bracket assembly is displaceable between an extended position and a retracted position. A biasing mechanism is coupled with the pivot bracket assembly. The biasing mechanism urges the pivot bracket assembly toward the extended position when the pivot bracket assembly is in the extended position and urges the pivot bracket assembly toward the retracted position when the pivot bracket assembly is in the retracted position. A lever is preferably attached to the pivot bracket assembly. The lever facilitates manual displacement of the pivot bracket assembly to an over center position from the retracted position to the extended position.

The assembly may additionally include a pivot frame securable to a movable structure, where the pivot bracket assembly includes a pivot bracket pivotably attached to the wheel frame at one end and pivotably attached to the biasing mechanism at an opposite end, the pivot bracket being coupled with the pivot frame, and a follower bracket pivotably attached at one end to the wheel frame and at an opposite end to the pivot frame.

The biasing mechanism preferably includes a gas strut having a cylinder and a piston rod, where in the retracted position, a line along a longitudinal axis of the piston rod passes below a pivot point on the pivot frame, and where in the extended position, the line along the longitudinal axis of the piston rod passes above the pivot point on the pivot frame.

In another exemplary embodiment of the invention, a selectively movable platform assembly includes a platform including at least two wheels and the retractable wheel assembly described herein.

In yet another exemplary embodiment of the invention, a retractable wheel assembly for a selectively movable platform includes a wheel frame supporting a wheel and a pivot bracket assembly secured to the wheel frame. The pivot bracket assembly is displaceable between an extended position and a retracted position. A biasing mechanism is coupled at one end with the pivot bracket assembly and at an opposite end to the platform, where the biasing mechanism urges the pivot bracket assembly toward the extended position when the pivot bracket assembly is in the extended position and urges the pivot bracket assembly toward the retracted position when the pivot bracket assembly is in the retracted position. The wheel is extended via a lever coupled with the pivot bracket assembly. The wheel is retracted via a downward force on the platform or chassis.

BRIEF DESCRIPTION OF THE DRAWINGS

These and other aspects and advantages of the present invention will be described in detail with reference to the accompanying drawings, in which.

DETAILED DESCRIPTION OF THE INVENTION

Figure 1:
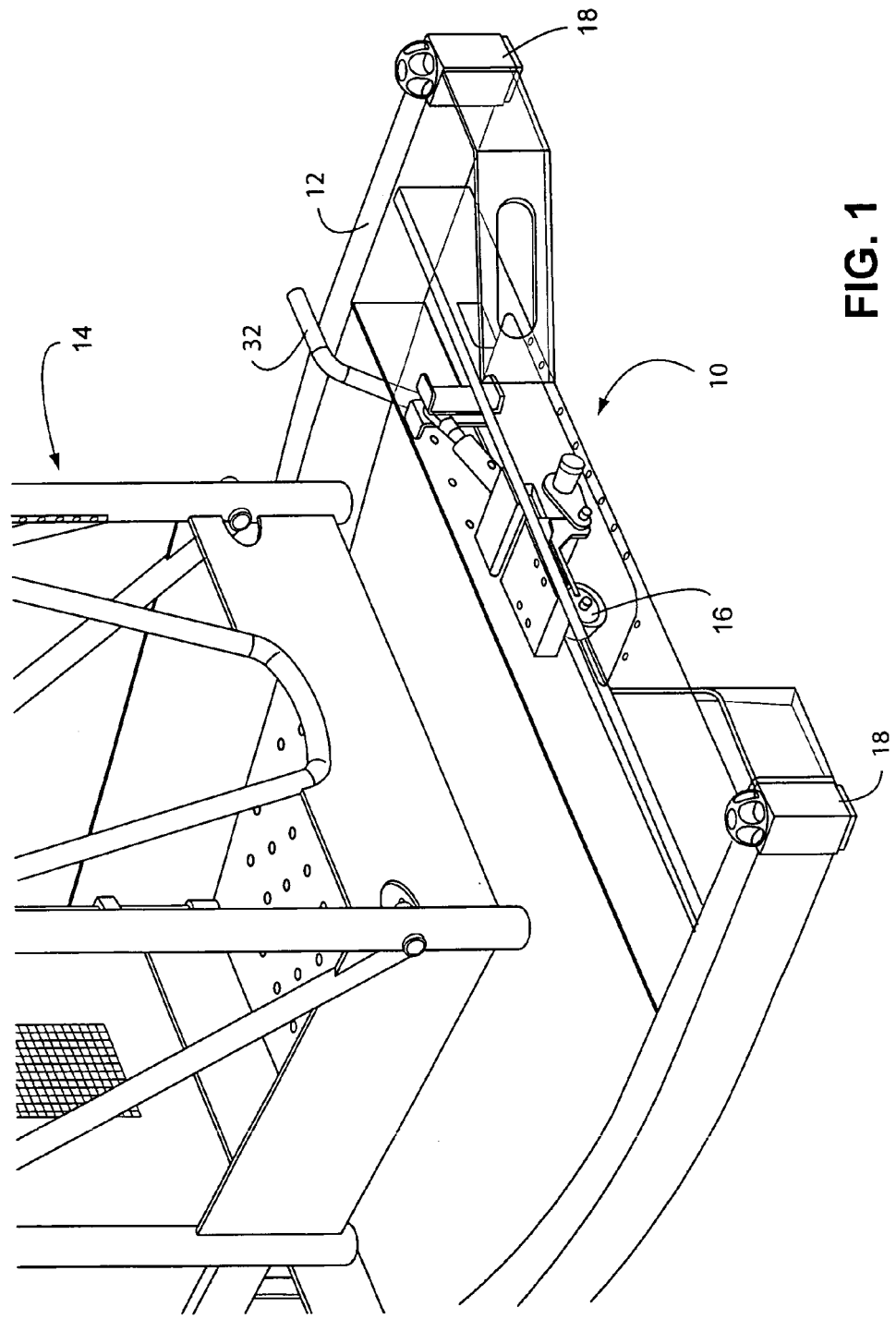
FIG. 1 is a perspective view of the retractable wheel assembly in its retracted position as part of a platform for supporting a lift ladder.
Figure 2:
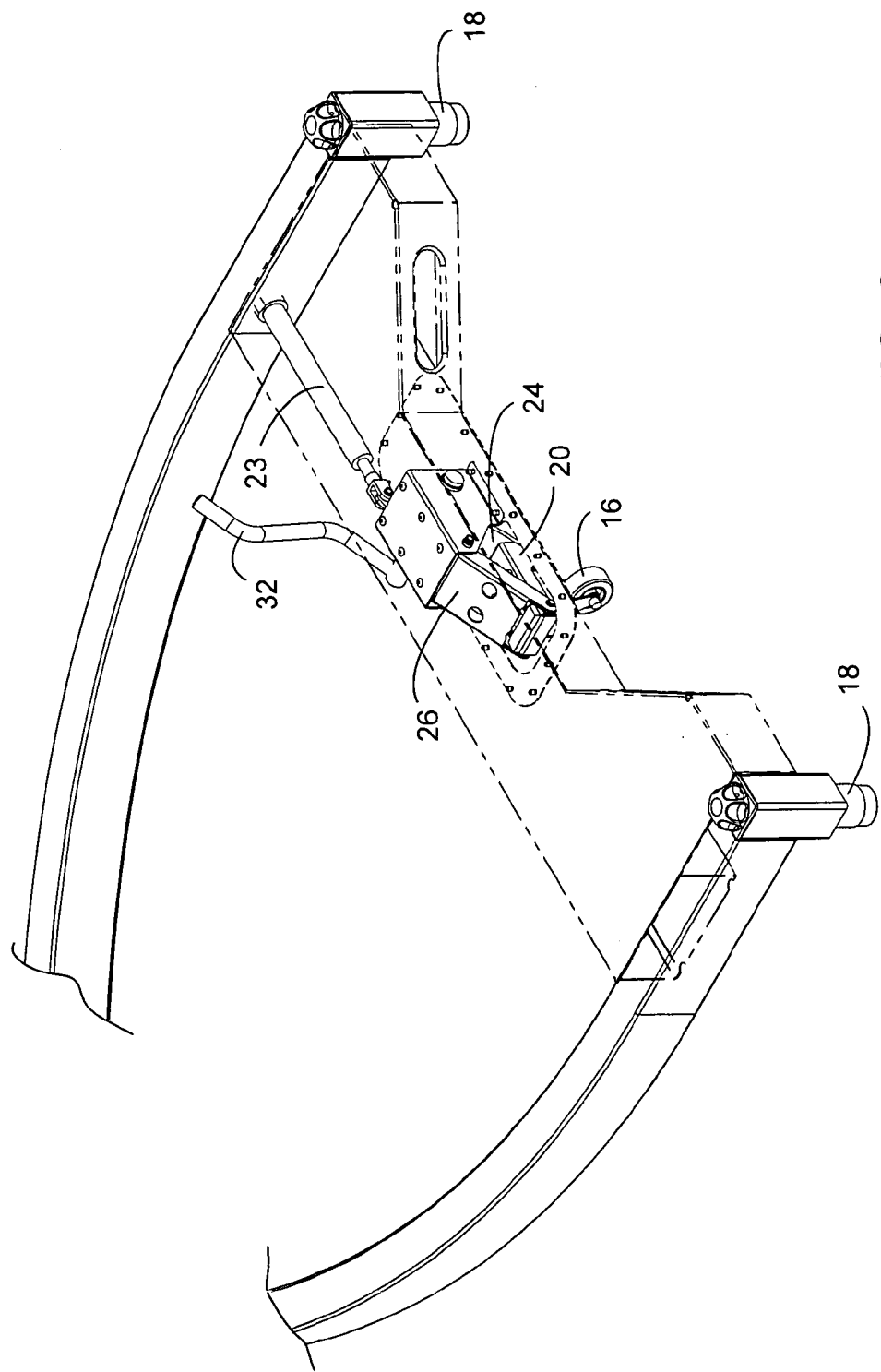
FIG. 2 is a close-up perspective view showing the retractable wheel assembly in its extended position.

FIGS. 1 and 2 illustrate an exemplary application of the retractable wheel assembly described herein. Although the drawings show a caster wheel, it should be understood that any wheel type may be used, and the invention is not meant to be limited to the illustrated example. In this exemplary application, the retractable caster assembly 10 is attached to a movable structure such as a platform or base 12 of a ladder lift. The exemplary ladder lift includes a lifting mechanism (not shown) that raises and lowers a working platform 14 on a mast.

During transport, the retractable wheel assembly 10 is set in its extended position as shown in FIG. 2, and a wheel 16 in cooperation with rear wheels (not shown) affixed to the platform 12 facilitate manual positioning of the apparatus to a working position. The structure of the retractable wheel assembly 10, described in more detail below, enables a user to retract the assembly 10 via a downward force on the platform 12 or chassis when the platform is positioned in its desired working position. With the wheel assembly 10 retracted as shown in FIG. 1, the platform rests on pads 18 and is prevented from inadvertent movement of the platform 12, even if the working position is on an incline or the like.

Figure 3:
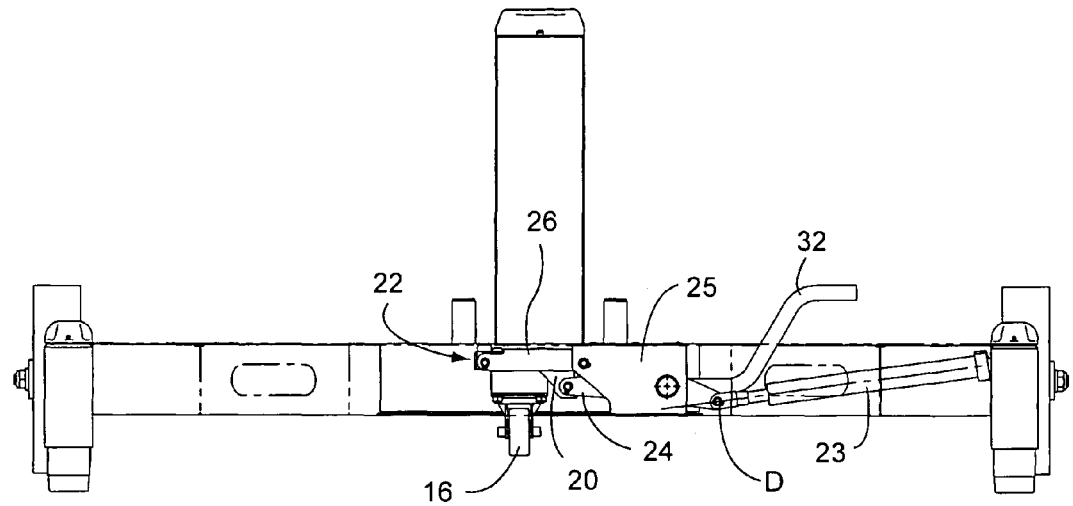
FIG. 3 shows the retractable wheel assembly in its retracted position.
Figure 4:
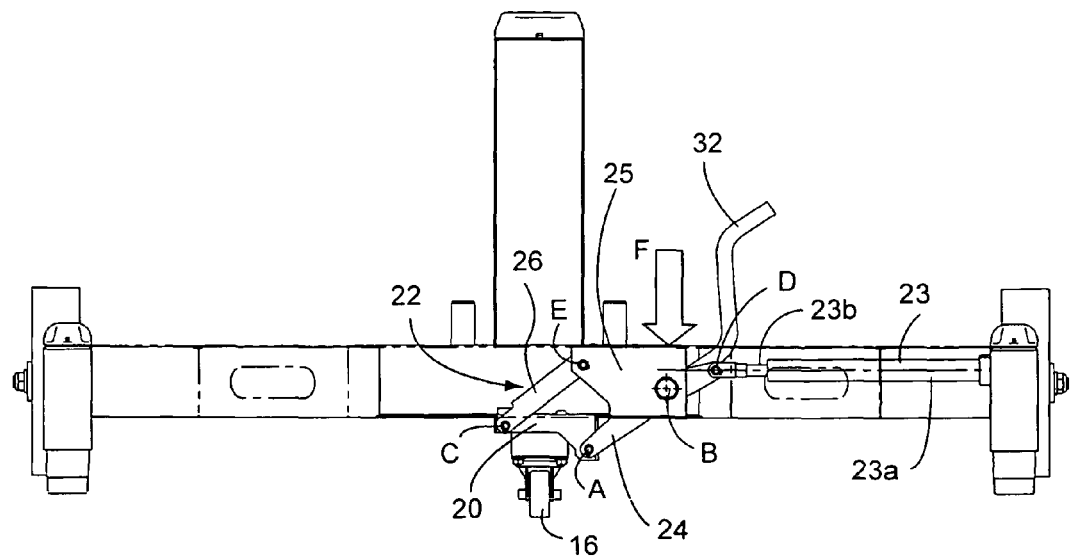
FIG. 4 shows the wheel assembly in its extended position.

With reference to FIGS. 3 and 4, the retractable wheel assembly 10 includes a wheel frame 20 supporting the wheel 16. A pivot bracket assembly 22 is secured to the wheel frame 20 and is displaceable between an extended position (FIG. 4) and a retracted position (FIG. 3).

The pivot bracket assembly 22 includes a pivot bracket 24 that is pivotably attached at one end to the wheel frame 20 at pivot connection A. A central pivot frame 25 is secured to the movable structure 12. The pivot bracket 24 is also pivotably attached to the central pivot frame 25 at pivot connection B and at an opposite end to a biasing mechanism 23 at pivot connection D. The pivot bracket assembly 22 additionally includes a follower bracket 26 pivotably attached at one end to the wheel frame 20 (pivot C) and at an opposite end to the central pivot frame 25 at pivot connection E.

The biasing mechanism 23 is coupled with the movable structure 12 at one end and with the pivot bracket assembly 22 at an opposite end as shown. The biasing mechanism 23 is preferably a gas strut or the like including a cylinder 23a and a piston rod 23b. In the retracted position (FIG. 3), a line along a longitudinal axis of the piston rod 23b extends below the pivot point B, and thereby biases the pivot bracket assembly 22 and the wheel frame 20 toward the retracted position. In the extended position shown in FIG. 4, the line along the longitudinal axis of the piston rod is shifted over center and intersects the wheel frame 20 on an opposite side of the pivot connection B. In this manner, in the extended position, the biasing mechanism 23 biases the pivot bracket assembly 22 and the wheel frame 20 toward the extended position.

The wheel assembly 10 is provided with a lever 32 attached to the pivot bracket assembly 22, which facilitates manual displacement of the pivot bracket assembly 22 from the retracted position to the extended position. More particularly, the lever 32 is attached to the pivot bracket 24.

In use, with the wheel assembly in its extended position, the movable structure 12 such as a platform or the like can be readily positioned to a desired working location. The biasing mechanism 23 and the geometry of the pivot bracket assembly are configured to prevent the wheel assembly from retracting during positioning by the weight of the movable structure or by variations in the ground surface. The assembly is functional even if the platform is supported via leveling jacks, regardless of a position of the jacks. Upon reaching the working location, the retractable wheel assembly can be displaced to its retracted position via a force F (downward in FIG. 4) such as by stepping on the platform 12, chassis or the like. The force F shifts the biasing mechanism over center to thereby support the wheel assembly in the retracted position (FIG. 3). When it is desired to again extend the wheel assembly, the lever 32 is manipulated back to the position shown in FIG. 4, and the assembly is held in the extended position by the biasing mechanism 23.

The retractable wheel assembly described herein enables a movable structure to be selectively movable to facilitate positioning of a movable structure and securing of the movable structure in use. A biasing mechanism is selectively positioned to exert a pivot force to maintain the wheel assembly in whichever of the extended position or retracted position is desired to thereby enable the wheel assembly to be securely held in its extended position during transport and to maintain the wheel assembly in the retracted position when desired.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A retractable wheel assembly cooperable with a movable structure, the retractable wheel assembly comprising:
   a wheel frame supporting a wheel;
   a pivot bracket assembly coupleable with the movable structure and secured to the wheel frame, the pivot bracket assembly being displaceable between an extended position and a retracted position; and
   a biasing mechanism coupled with the pivot bracket assembly, wherein the biasing mechanism urges the pivot bracket assembly toward the extended position when the pivot bracket assembly is in the extended position and urges the pivot bracket assembly toward the retracted position when the pivot bracket assembly is in the retracted position, and wherein in the extended position, the biasing mechanism acts on the pivot bracket assembly such that a predetermined downward force directly on the pivot bracket assembly via the movable structure shifts the biasing mechanism over center so that the pivot bracket assembly is displaced to the retracted position.

2. A retractable wheel assembly according to claim 1, further comprising a lever attached to the pivot bracket assembly, the lever facilitating manual displacement of the pivot bracket assembly to an over center position from the retracted position to the extended position, wherein the biasing mechanism acts on the pivot bracket assembly such that the pivot bracket assembly is displaced to the retracted position by the predetermined downward force applied via the movable structure and separate from the lever.

3. A retractable wheel assembly according to claim 1, further comprising a pivot frame securable to the movable structure, wherein the pivot bracket assembly comprises:
   a pivot bracket pivotably attached to the wheel frame at one end and pivotably attached to the biasing mechanism at an opposite end, wherein the pivot bracket is coupled with the pivot frame; and
   a follower bracket pivotably attached at one end to the wheel frame and at an opposite end to the pivot frame.

4. A retractable wheel assembly according to claim 1, wherein the biasing mechanism comprises a gas strut, having one end coupled with the pivot bracket assembly and an opposite end attachable to a movable structure.

5. A retractable wheel assembly according to claim 3, wherein the biasing mechanism comprises a gas strut including a cylinder and a piston rod, and wherein in the retracted position, a line along a longitudinal axis of the piston rod passes below a pivot point on the pivot frame, and wherein in the extended position, the line along the longitudinal axis of the piston rod passes above the pivot point on the pivot frame.

6. A retractable wheel assembly according to claim 3, further comprising a lever attached to the pivot bracket, the lever facilitating manual displacement of the pivot bracket assembly to an over center position from the retracted position to the extended position.

7. A selectively movable platform assembly comprising:
a platform including at least two wheels; and
a retractable wheel assembly attached to the platform and displaceable between an extended position and a retracted position, the retractable wheel assembly comprising:
a wheel frame supporting a wheel,
a pivot bracket assembly secured to the wheel frame, the pivot bracket assembly being displaceable between an extended position and a retracted position, and
a biasing mechanism coupled with the pivot bracket assembly, wherein the biasing mechanism urges the pivot bracket assembly toward the extended position when the pivot bracket assembly is in the extended position and urges the pivot bracket assembly toward the retracted position when the pivot bracket assembly is in the retracted position, and wherein in the extended position, the biasing mechanism acts on the pivot bracket assembly such that a predetermined downward force on the platform shifts the biasing mechanism over center so that the pivot bracket assembly is displaced to the retracted position.

8. A selectively movable platform assembly according to claim 7, further comprising a lever attached to the pivot bracket assembly, the lever facilitating manual displacement of the pivot bracket assembly to an over center position from the retracted position to the extended position.

9. A selectively movable platform assembly according to claim 7, further comprising a pivot frame secured to the platform, wherein the pivot bracket assembly comprises:
a pivot bracket pivotably attached to the wheel frame at one end and pivotably attached to the biasing mechanism at an opposite end, wherein the pivot bracket is coupled with the pivot frame; and
a follower bracket pivotably attached at one end to the wheel frame and at an opposite end to the pivot frame.

10. A selectively movable platform assembly according to claim 7, wherein the biasing mechanism comprises a gas strut, having one end coupled with the pivot bracket assembly and an opposite end coupled with the platform.

11. A selectively movable platform assembly according to claim 7, wherein the platform comprises pads on which the platform is supported when the pivot bracket assembly is disposed in the retracted position.

12. A selectively movable platform assembly according to claim 9, further comprising a lever attached to the pivot bracket, the lever facilitating manual displacement of the pivot bracket assembly to an over center position from the retracted position to the extended position.

13. A selectively movable platform assembly according to claim 11, wherein the pads comprise leveling jacks, and wherein the biasing mechanism is functional regardless of a position of the jacks or of variations in a ground surface on which the platform is supported.

14. A retractable wheel assembly for a selectively movable platform supported via a chassis, the wheel assembly comprising:
a wheel frame supporting a wheel;
a pivot bracket assembly secured to the wheel frame, the pivot bracket assembly being displaceable between an extended position and a retracted position; and
a biasing mechanism coupled at one end with the pivot bracket assembly and at an opposite end to the platform, wherein the biasing mechanism urges the pivot bracket assembly toward the extended position when the pivot bracket assembly is in the extended position and urges the pivot bracket assembly toward the retracted position when the pivot bracket assembly is in the retracted position,
wherein the wheel is extended via a lever coupled with the pivot bracket assembly, and wherein in the extended position, the biasing mechanism acts on the pivot bracket assembly such that a predetermined downward force directly on the platform and separate from the lever shifts the biasing mechanism over center so that the pivot bracket assembly is displaced to the retracted position.

* * * * *